SWITCHING CIRCUIT UTILIZING SEMI-CONDUCTOR, CONTROLLED RECTIFIERS

Filed Aug. 29, 1960

INVENTOR.
STUART C. ROCKAFELLOW
BY
Woodhams, Blanchard and Flynn
ATTORNEYS 3,058,010

SWITCHING CIRCUIT UTILIZING SEMI-CONDUCTOR, CONTROLLED RECTIFIERS

Stuart C. Rockafellow, Plymouth, Mich., assignor to Robotron Corporation, Detroit, Mich., a corporation of Michigan Filed Aug. 29, 1960, Ser. No. 52,498
7 Claims. (Cl. 307—88.5)

This invention relates to a switch circuit and particularly to a type thereof using a pair of semiconductor, controlled rectifiers connected in back-to-back relationship.

In any back-to-back connected switch circuit involving components having the characteristic that a flow of current will continue therethrough when such flow has once started for so long as an anode potential is applied thereto, it is essential only to start current flow through the appropriate component with each half-wave from the power source to effect a flow in the circuit for the entire half-wave. This has already been done in a variety of ways. Further, for ease of control, it is often convenient to provide controllable means for initiating such flow only with respect to one of the two back-to-back connected components and to provide automatic means for initiating the other thereof. With such arrangements it is necessary only to control externally one of said flow initiating means and the other will follow. Such general arrangements with such flow-controlling devices as thyratrons and ignitrons are well known and have been commonly used for many years in such connections as motor-control, resistance-welding, plating, heating, light-dimming and many other industrial applications. However, the circuits developed for the use of thyratrons and ignitrons are not applicable for use with semiconductor, controlled rectifiers.

Accordingly, in order to obtain in such switch circuitry the many well-known advantages of solid-state components, it is desirable to devise a circuit employing the general approach and manner of operation of previously known thyratron or ignitron back-to-back circuits but which is adaptable to use with semiconductor, controlled rectifiers.

Therefore, the objectives of the invention are:

(1) To provide a switch circuit for energizing and de-energizing from an alternating current source a pair of conductors in response to the opening and closing of a switch.

(2) To provide a switch circuit, as aforesaid, which still has the presently known advantages of back-to-back connected valve components but wherein such components are of the solid-state type.

(3) To provide a switch circuit, as aforesaid, utilizing semiconductor, controlled rectifiers as the back-to-back connected valve components.

(4) To provide a switch circuit, which will be compact and rugged, which will not develop heat, which will have low maintenance requirements while providing high reliability, which will be adaptable to use with printed circuits and which will in other respects utilize the various known advantages of solid-state components such as semi-conductor, controlled rectifiers.

(5) To provide a switch circuit, as aforesaid, utilizing a pair of back-to-back connected semiconductor, controlled rectifiers as the valve units thereof wherein external control is applied to only one of said valves and the other automatically follows the operation of the first valve.

Other objects and purposes of the invention will be apparent to persons acquainted with devices of this general type upon reading the following disclosure and inspection of the accompanying drawings.

In general, the invention consists of a pair of back-to-back connected, semiconductor, controlled rectifiers wherein current flow through the first of said rectifiers is initiated by externally controlled master initiating means and current flow through the second of said rectifiers is initiated by slave initiating means. Said last-named means responds to the energy developed in a transformer as the result of the collapsing of an electrical field developed within said transformer by a pulse resulting from the conductivity of said first rectifier.

Figure 1:
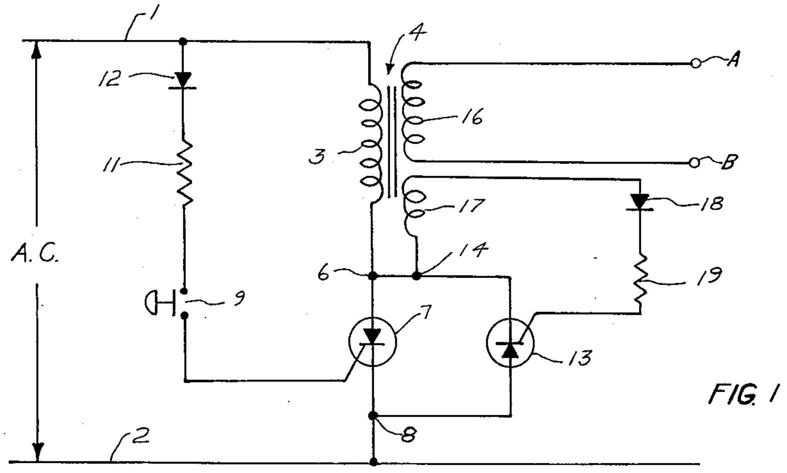
FIGURE 1 is a schematic diagram of a circuit embodying the invention.

Referring now to FIGURE 1, there are shown supply lines 1 and 2 connected in any convenient manner to a source of alternating potential. Line 1 is connected through a junction point 2 to one end of the primary winding 3 of a transformer 4. The other end of said primary winding is connected through a junction point 6 to the anode of a semiconductor, controlled rectifier 7 whose cathode is connected to a junction point 8 and thence to the conductor 2. The gate of said rectifier 7 is connected through a switch 9, through a resistance 11 of relatively high value such as 100,000 to 500,000 ohms, and thence through a rectifier 12 back to the line 1. Said rectifier 12 is sensed to permit current flow from line 1 toward the gate of the semiconductor, controlled rectifier 7. This last-described circuit including the gate of the rectifier 7 may be considered a master initiating circuit.

A further semiconductor, controlled rectifier 13 has its anode connected to the junction point 8 and its cathode connected through a junction point 14 to the junction point 6.

The transformer 4 has a first secondary winding 16 constituting the output of the circuit herein illustrated and a second relatively small, secondary winding 17. The latter secondary winding is connected at one end to the junction point 14 and at the other end to the positive side of a rectifier 18 whose negative side is connected through a convenient, protective resistor 19 to the gate of the semiconductor, controlled rectifier 13. This circuit including the gate of the rectifier 13 may be considered a slave initiating circuit.

Operation of the device is initiated by closure of the switch 9 in the master initiating circuit. Since said switch may be any of many types, manual, mechanical, electrical or it may be an entire electronic circuit, the closure of said switch may be utilized to perform or be responsive to any of many types of control functions.

Upon closure of the switch 9, a positive pulse appearing in conductor 1 will be transmitted simultaneously to the anode and to the gate of the rectifier 7. Thus, said rectifier 7 will be conductive and a pulse will appear in the secondary winding 16 and at the output terminals A and B of the circuit.

Upon the appearance of a positive pulse in the conductor 2, the resistance of the rectifiers 7 and 12 to current flow from cathode to anode will prevent such pulse from passing through either of the circuits involving these rectifiers. Therefore, the only path available to such a pulse is through a rectifier 13.

Figure 2:
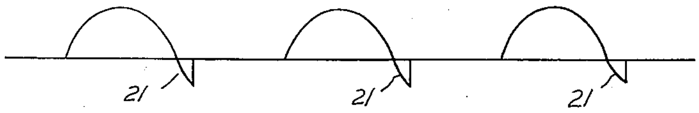
FIGURE 2 illustrates the current flow through the primary winding of a transformer in response solely to the conductivity of the externally controlled valve.

With the appearance of a positive pulse in conductor 1, the usual electric field will be created around the primary winding 3. With the ending of said positive pulse, this field will collapse and induce a small but definite flow of current in the opposite direction, this flow being represented by the parts 21 of the graph shown in FIGURE 2. Such oppositely directed flow through the primary winding 3 will induce a momentary and small, but sufficient, flow in the secondary winding 17 to pass through the rectifier 18 and apply a positive voltage to the gate of the semi-conductor, controlled rectifier 13. Since this voltage in the slave initiation circuit appears immediately after the termination of the positive pulse appearing in conductor 1, it by the same token appears at the beginning of the pulse appearing in conductor 2. Therefore, the rectifier 13 is rendered conductive at the beginning of the pulse appearing in conductor 2 and said pulse will flow through the rectifier and through the primary winding 3. Thus, the reverse pulse properly appears in the output secondary winding 16 and at the terminals A and B.

When the positive pulse again appears in conductor 1, the cycle will repeat if the switch 9 is still closed. If said switch 9 has in the meantime been opened, then there is no gate voltage applied to the rectifier 7 and the same will not conduct. If there is no current flow through the primary winding 3 upon the appearance of the pulse in conductor 1, then there will be no electrical field to collapse and no starting voltage at the gate of rectifier 13, and hence no current flow through rectifier 13, when the pulse appears in conductor 2.

Thus, the closing of the switch 9 will start a current flow at the beginning of the next positive pulse appearing in conductor 1 following the closure of switch 9 regardless of when, with relation to said pulses, said switch closes. This is desirable for previously understood reasons in effecting accurate timing functions. Similarly, when said switch opens, the current flow will stop with the end of the next pulse appearing in conductor 2 following the opening of said switch regardless of when, with respect to said pulses, said switch opens. Thus, regardless of the precise opening and closing of said switch 9, the appearance of output pulses at the output terminals A and B will always commence with the beginning of a pulse appearing in conductor 1 and end with the end of a pulse in conductor 2.

Although a particular preferred embodiment of the invention has been disclosed above in detail for illustrative purposes, it will be understood that various or modifications in such disclosure, which lie within the scope of the appended claims, are fully contemplated.

What is claimed is

1. An electric switch comprising in combination a pair of supply conductors connectible to a source of alternating potential;

a valve circuit comprising a pair of back-to-back connected semiconductor, controlled rectifiers, said valve circuit being connected between said conductors and including means responsive to flow of current through said circuit for applying potential to a pair of output terminals;

means applying a positive potential to the gate of said first rectifier to render said first rectifier conductive in a predetermined timed relationship with the appearance of the positive potential at the anode of said first rectifier and other means responsive to the conductive condition of said first rectifier and operable when said first rectifier becomes non-conductive for applying a positive potential to the gate of the other rectifier in a predetermined timed relationship with the appearance of a positive potential at the anode of said other rectifier whereby said other rectifier is rendered conductive as a result of and in response to conduction of said first rectifier.

2. An electric switch comprising in combination: a pair of conductors connectible to a source of alternating potential;

means including a pair of output terminals and means responsive to flow of current through the hereinafter mentioned valve circuit for effecting the appearance of a potential at said output terminals;

a valve circuit comprising a pair of back-to-back connected semi-conductor, controlled rectifiers connected between said conductors;

means energized when a positive potential appears at the anode of a first of said rectifiers for applying positive potential to the gate of said first rectifier to thereby render said first rectifier conductive.

means connected between one principal electrode of said first rectifier and the gate of the other rectifier for providing a positive potential in response to termination of conduction of said first rectifier so that a positive potential is applied to the gate of said second rectifier and said second rectifier is thereby rendered conductive upon the appearance of the positive potential at its anode whereby said other rectifier can be rendered conductive only as a result of and following termination of conduction of said first rectifier.

3. An electric switch according to claim 2, in which said means connected between said one principal electrode of said first rectifier and the gate of the other rectifier is an energy storage means whereby energy supplied thereto by conduction of said first rectifier is utilized to cause conduction of said other rectifier after said first rectifier has ceased to conduct.

4. An electric switch according to claim 3, in which said energy storage means is a transformer and decay of the magnetic field of said transformer in response to termination of conduction of said first rectifier causes a positive pulse of energy to be applied to the gate of said other rectifier.

5. An electric switch comprising in combination: a pair of conductors connectible to a source of alternating potential;

a pair of output terminals;

a valve circuit including a pair of back-to-back connected semiconductor, controlled rectifiers and a transformer, said back-to-back connected rectifiers and the primary winding of said transformer being connected serially with respect to each other and between said conductors, said transformer having at least two secondary windings, one thereof being connected to siad output terminals;

master initiating means including a switch for applying a positive potential to the gate of a first of said rectifiers in a predetermined timed relationship with the appearance of a positive potential at the anode of said first rectifier;

slave initiating means connected to the second of said secondary windings for applying a positive potential to the gate of the second of said rectifiers and following the collapse of the electric field around said primary winding, said collapse occurring upon the termination of a pulse passing, as a result of the conductivity of said first rectifier, through said primary winding;

whereby said second rectifier is rendered conductive at the beginning of a pulse immediately following said terminated pulse.

6. The device defined in claim 5 wherein the master initiating means connected to the gate of said first rectifier including a rectifier serially connected between said last-named gate and one of said conductors, said rectifier being sensed so that its anode is connected to said one conductor.

7. The device defined in claim 5 wherein the slave initiating means connected to the gate of said second rectifier includes a conductor from one end of said secondary winding through a further rectifier to said gate and means connecting the other end of said secondary winding operatively to the cathode of said second semiconductor, controlled rectifier, said further rectifier being sensed so that its positive terminal is connected to said second secondary winding.

References Cited in the file of this patent

UNITED STATES PATENTS 2,920,240 Macklem ---------------- Jan. 5, 1960